(12) United States Patent  (10) Patent No.: US 10,797,377 B2
Zhu et al. (45) Date of Patent: Oct. 6, 2020

(54) MOBILE DEVICE AND METHOD FOR MANUFACTURING THE SAME

(71) Applicant: AAC Technologies Pte. Ltd., Singapore (SG)

(72) Inventors: Xiaolong Zhu, Shenzhen (CN); Liyi Zhou, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 144 days.

(21) Appl. No.: 16/236,387

(22) Filed: Dec. 29, 2018

(65) Prior Publication Data

US 2019/0207299 A1 Jul. 4, 2019

(30) Foreign Application Priority Data

Jan. 3, 2018 (CN) .......................... 2018 1 0003227

(51) Int. Cl.
| | |
|---|---|
| *H01Q 1/24* | (2006.01) |
| *H04M 1/02* | (2006.01) |
| *H01Q 1/38* | (2006.01) |
| *B32B 17/06* | (2006.01) |
| *B32B 37/18* | (2006.01) |
| *H04M 1/03* | (2006.01) |
| *H01R 13/24* | (2006.01) |

(52) U.S. Cl.
CPC ............ *H01Q 1/243* (2013.01); *B32B 17/061* (2013.01); *B32B 37/18* (2013.01); *H01Q 1/38* (2013.01); *H04M 1/0277* (2013.01); *H04M 1/0283* (2013.01); *H04M 1/03* (2013.01); *B32B 2255/205* (2013.01); *B32B 2457/00* (2013.01); *H01R 13/24* (2013.01)

(58) Field of Classification Search
CPC .......... H01Q 1/24; H01Q 1/241; H01Q 1/242; H01Q 1/243; H01Q 1/38; H01Q 9/0407; H01Q 1/40

See application file for complete search history.

(56) References Cited

U.S. PATENT DOCUMENTS

| | | | | |
|---|---|---|---|---|
| 2014/0106684 A1* | 4/2014 | Burns | .................... | H01Q 21/28 455/78 |
| 2016/0294041 A1* | 10/2016 | Wang | ...................... | C23C 24/04 |
| 2018/0269568 A1* | 9/2018 | Xu | ......................... | H01Q 21/28 |

\* cited by examiner

*Primary Examiner* — Hoang V Nguyen
(74) *Attorney, Agent, or Firm* — IPro, PLLC; Na Xu

(57) ABSTRACT

The present disclosure relates to the field of communication devices and in particular, to a mobile device and a method for manufacturing the mobile device. The mobile device includes: a metal middle frame, a glass back shell covering the metal middle frame, and an FPC antenna disposed on an inner surface of the glass back shell. The FPC antenna includes a flexible substrate layer and a metal pattern layer attached to the flexible substrate layer, the flexible substrate layer is laminated onto the inner surface of the glass back shell, the metal pattern layer is formed on a surface of the flexible substrate layer by a LDS process, the FPC antenna is electrically connected to the metal middle frame, and the inner surface of the glass back shell faces the metal middle frame. The FPC antenna in the mobile device provided by the present disclosure has a better performance.

8 Claims, 2 Drawing Sheets

MOBILE DEVICE AND METHOD FOR MANUFACTURING THE SAME

CROSS-REFERENCE TO RELATED APPLICATIONS

The present application claims priority to Chinese Patent Application No. 201810003227.X, filed on Jan. 3, 2018, the content of which is incorporated herein by reference in its entirety.

TECHNICAL FIELD

The present disclosure relates to the field of communication devices and, in particular, to a mobile device and a method for manufacturing the mobile device.

BACKGROUND

With the rapid popularization of mobile communication devices such as cellphones, users increasingly value the quality and appearance of cellphones. A glass back screen has become a new trend for a shell of a cellphone in the next few years due to its advantages such as multi-faceted appearance, wireless charging and low impact on antenna performance.

FPC antennas are often used as transmission and reception antennas in cellphones. In a conventional process, in order to save space, the FPC antenna is manually attached along an outer edge of the plastic shell of most cellphones. Because of swelling or shrinkage of the FPC and the plastic and non-planar fitness therebetween, the fitting position accuracy is low, which has a significant impact on the antenna performance.

BRIEF DESCRIPTION OF DRAWINGS

In order to more clearly illustrate technical solutions in embodiments of the present disclosure, the accompanying drawings used in the embodiments are briefly introduced as follows. It should be noted that the drawings described as follows are merely part of the embodiments of the present disclosure, other drawings can also be acquired by those skilled in the art based on those drawings without paying creative efforts.

REFERENCE SIGNS

Figure 1:
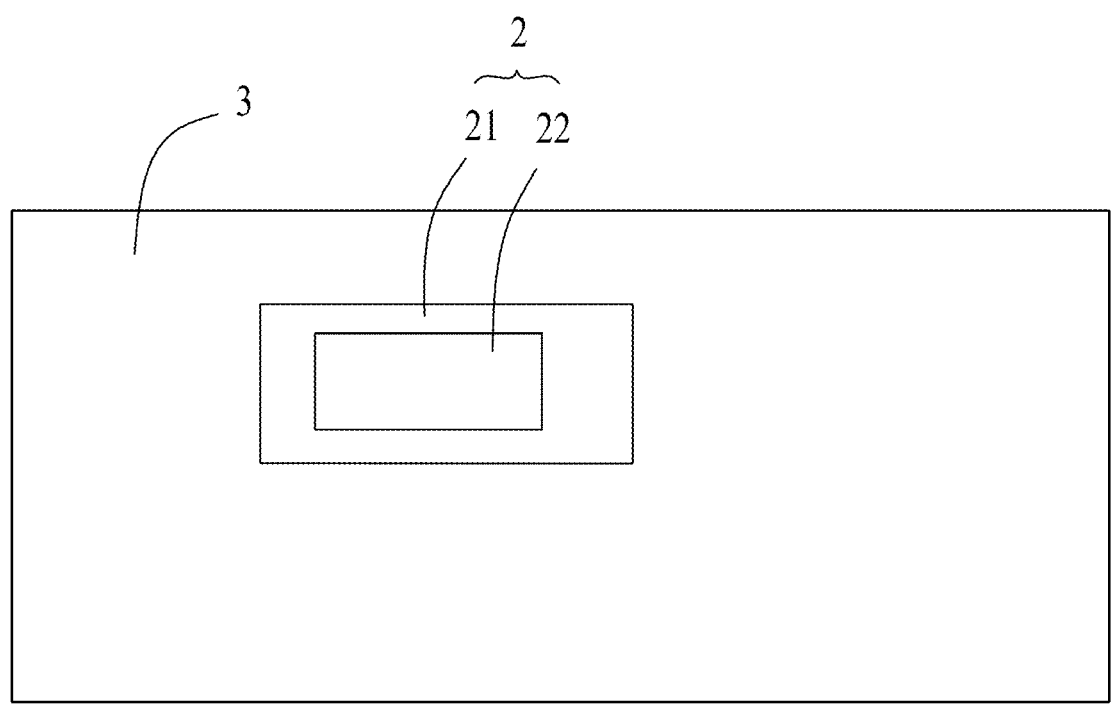
FIG. 1 is a schematic diagram of a partial structure of a mobile device according to an embodiment of the present disclosure.
Figure 2:
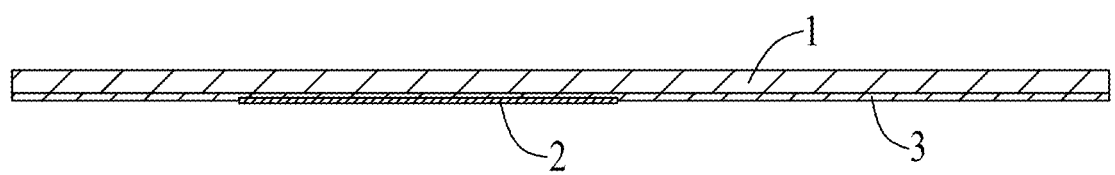
FIG. 2 is a cross-sectional view of a partial structure of a mobile device according to an embodiment of the present disclosure.

1—glass back shell;
2—FPC antenna;
21—flexible substrate layer;
22—metal pattern layer;
3—beautification lacquer layer;
4—metal middle frame;
5—speaker box;
6—circuit board;
7—POGO PIN;
8—first connector;
9—second connector;
10—elastic sheet.

The drawings herein are incorporated into and constitute a part of the present specification, which show the embodiments of the present disclosure and illustrate the principles of the present disclosure together with the specification.

DESCRIPTION OF EMBODIMENTS

The present disclosure will be described in the following with reference to the accompanying drawings in the embodiments of the present disclosure.

As shown in FIGS. 1-5, an embodiment of the present disclosure provides a mobile device including a metal middle frame 4, a glass back shell 1 and an FPC antenna 2. The glass back shell 1 can cover the metal frame 4. The FPC antenna 2 includes a flexible substrate layer 21 and a metal pattern layer 22 attached to the flexible substrate layer 21. The flexible substrate layer 21 is laminated onto an inner surface of the glass back shell 1. The metal pattern layer 22 is formed on a surface of the flexible substrate layer 21 by a LDS process. The FPC antenna 2 is electrically connected to the metal middle frame 4. The inner surface of the glass back shell 1 faces the metal middle frame 4.

Specifically, those skilled in the art can flexibly design a shape of the metal middle frame 4 and select the type of a material used in the metal middle frame 4 according to actual demands. Accordingly, those skilled in the art can also surface-treat the metal middle frame 4 according to actual demands. The glass back shell 1 can be processed by a method similar to a conventional glass production method. The glass back shell 1 can be designed such that all surfaces thereof are flat surfaces according to actual needs, or some surfaces are flat surfaces while some other surfaces are curved surfaces so as to meet different requirements of the users. The glass back shell 1 can be bonded to and cover the metal middle frame 4 by an adhesive or the like; or the metal middle frame 4 and the glass back shell 1 are each provided with a snap structure so that the glass back shell 1 can be fixed and connected to the metal middle frame 4 by means of a snap connection. It is also conceivable that the mobile device may further include other components such as a display screen, and the display screen can also be connected to the metal middle frame 4. Herein, the display screen may be arranged oppositely to the glass back shell 1. In this case, the display panel, the metal middle frame 4 and the glass back shell 1 can enclose an accommodation chamber, and a circuit board 6 can be fixed and mounted in the accommodation chamber. The circuit board 6 can be electrically connected to the display screen.

Specifically, the flexible substrate layer 21 of the FPC antenna 2 can be manufactured by a conventional FPC production method and then laminated onto the inner surface of the glass back shell 1 by a lamination technique. In an embodiment, the flexible substrate layer 21 is laminated onto the inner surface of the glass back shell 1 by a 3D vacuum laminator. With the lamination method using the 3D vacuum laminator, the working efficiency of connection between the flexible substrate layer 21 and the glass back shell 1 can be significantly improved. At the same time, with the 3D vacuum laminator, the flexible substrate layer 21 can be heated, so that the flexible substrate layer 21 can be more tightly connected to the glass back shell 1. Those skilled in the art can flexibly design the size, the shape, and other parameters of the flexible substrate layer 21 to be processed according to the design requirements. Optionally, the size and shape of the flexible substrate layer 21 can be made the same as those of the glass back shell 1, so that the flexible substrate layer 21 can have both a function of protecting the glass back shell and a function of being shatter-proof and burst-proof.

For example, the metal pattern layer 22 of the FPC antenna 2 is formed on a surface of the flexible substrate layer 21 attached to the inner surface of the glass back shell 1 by a LDS manufacturing process. Since the metal pattern layer 22 is formed by laser positioning and subsequent laser engraving in the LDS process, the positioning accuracy of the metal pattern layer 22 is much better than that of a conventional manual fitting technique.

In an embodiment, the forming of the glass back shell 1 and the FPC antenna 2 includes following steps:

Step a, a glass back shell 1 is provided;
Step b, a flexible substrate layer 21 is provided;
Step c, the flexible substrate layer 21 is laminated onto a surface of the glass back shell 1; and
Step d, a metal pattern layer 22 is formed on a surface of the flexible substrate layer 21 by a LDS process.

As described above, in the mobile device provided by the present disclosure, the back shell of the mobile device is manufactured by using a glass material and the FPC antenna 2 is attached to the inner surface of the glass back shell 1. In this case, since the glass back shell 1 has strong resistance to deformation, it can avoid an untight fitness between the FPC antenna 2 and the glass back shell 1 during the subsequent processing and usage of the mobile device, which may lead to low accuracy of the fitting positioning of the FPC antenna 2. In this way, the performance of the FPC antenna 2 can be improved, thereby improving the entire quality of the mobile device.

Further, a PVD coating may be provided on the surface of the glass back shell 1. For example, a physical vapor deposition (PVD) process can be used to form a PVD coating may on the processed glass back shell 1. In this way, the physical properties of the glass back shell 1, such as the surface hardness and the abrasive resistance, can be significantly improved. At the same time, corrosion resistance of the surface of the glass back shell 1 can be also improved with the PVD coating, which can increase the service life of the glass back shell 1.

In order to reduce the processing cost, optionally, the PVD coating is only provided on an outer surface of the glass back shell 1. It should be noted that after the mobile device is assembled, the glass back shell 1 has two opposite surfaces in its thickness direction, one of the two surfaces is encapsulated inside the mobile device and is the inner surface, and the other one surface is the outer surface.

Further, in order to improve the user experience and further beautify the appearance of the mobile device, optionally, a beautification lacquer layer 3 is provided on the surface of the glass back shell 1. Beautification lacquers with various colors can be selected. The surface of the glass back shell 1 is coated with a beautification lacquer by means of transfer printing, silk printing or spraying, so as to form the beautification lacquer layer 3. A thickness of the beautification lacquer layer 3 can be controlled according to actual demands.

Similarly, in a case where the glass back shell 1 is made of glass of a colorless transparent material, the beautification lacquer layer 3 can be provided only on the inner surface of the glass back shell 1, so that the beautification lacquer layer 3 is not easily damaged. At the same time, the production cost can be reduced.

In the process of achieving electrical connection between the FPC antenna 2 and the metal middle frame 4, the FPC antenna 2 may be directly connected to the metal middle frame 4, or the FPC antenna 2 may be indirectly connected to the metal middle frame 4 via a circuit board 6.

Optionally, the FPC antenna 2 is connected to the metal middle frame 4 via a connector. The connector may be a metal connection plate, a metal connection wire, or the like. Two ends of the connector may be connected to the FPC antenna 2 and the metal middle frame 4 by welding, respectively, so as to achieve the purpose of connecting the FPC antenna 2 to the metal middle frame 4. In this way, the used amount of the FPC antenna 2 can be reduced, so that the production cost can be reduced, and the profit margin can be increased. At the same time, a problem that the FPC antenna 2 cannot be easily and directly connected to the metal middle frame 4 when a partition structure exists therebetween then can also be solved.

Figure 3:
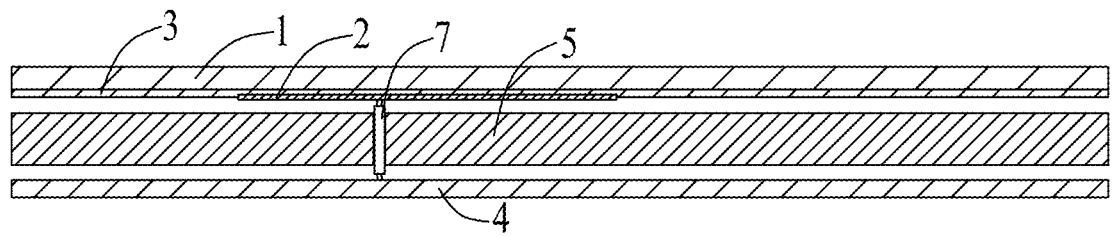
FIG. 3 is a schematic diagram of an assembly of a connector in a mobile device according to an embodiment of the present disclosure.

Optionally, as shown in FIG. 3, the connector may be a POGO PIN 7, and the mobile device provided by the present disclosure further includes a speaker box 5. The speaker box 5 may be disposed between the metal middle frame 4 and the glass back shell 1. The speaker box 5 may be provided therein with an installation hole penetrating through the speaker box 5 in a thickness direction of the glass back shell 1, and the installation hole can be used for installing the connector so that the connector is connected to both the FPC antenna 2 and the metal middle frame 4.

Specifically, the POGO PIN 7 is a common and commercially available precision connector, and can be selected according to actual demands. Herein, optionally, gold is coated on respective surfaces of the needle shaft, the spring and the needle tube of the POGO PIN 7. In this way, the conduction effect of the connector can be improved. At the same time, since the POGO PIN 7 has a light weight, even if the connector is provided in the mobile device, an overall weight of the mobile device is not excessively increased. Moreover, during manufacturing of the speaker box 5, an installation hole may be reserved for installing the POGO PIN 7, or the installation hole can be formed by drilling or the like after manufacturing of the speaker box 5 is finished. A position limiting structure can be arranged in the installation hole. The POGO PIN 7 can be limited to a certain position by the position limiting structure, so that shift of the POGO PIN 7 within the installation hole does not easily occur, which can ensure the stability of the connection between the FPC antenna 2 and the metal middle frame 4.

Figure 4:
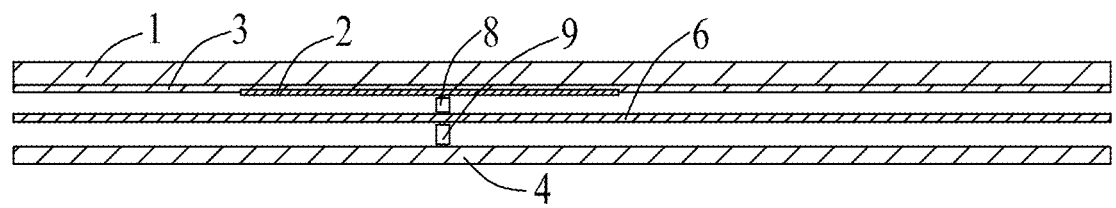
FIG. 4 is a schematic diagram of another assembly of a connector in a mobile device according to an embodiment of the present disclosure.

Optionally, as shown in FIG. 4, a first connector 8 and a second connector 9 are provided. In the thickness direction of the circuit board 6, the first connector 8 and the second connector 9 are connected to two opposite surfaces of the circuit board 6, respectively. The first connector 8 abuts against both the FPC antenna 2 and the circuit board 6, and the second connector 9 abuts against both the circuit board 6 and the metal middle frame 4. The FPC antenna 2 is connected to the metal middle frame 4 via the first connector 8 and the second connector 9.

For example, each of the first connector 8 and the second connector 9 may be a POGO PIN 7, and the first connector 8 and the second connector 9 may be welded to two opposite surfaces of the circuit board 6, respectively. Of course, the first connector 8 or the second connector 9 may also be other metal connector having other structure. In this case, the connection reliability between the structural members in the mobile device can be further improved. In this way, even if there is a partition structure between the metal middle frame 4 and the FPC antenna 2, the connection between the FPC antenna 2 and the metal middle frame 4 can be achieved without damaging the existing structure.

Figure 5:
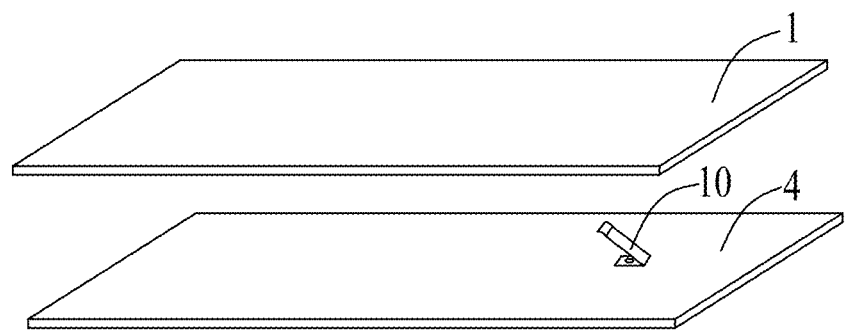
FIG. 5 is a schematic diagram of still another assembly of a connector in a mobile device according to an embodiment of the present disclosure.

Optionally, as shown in FIG. 5, the connector may be otherwise an elastic sheet 10 that is detachably connected to the metal middle frame 4, and the connector is also in contact with the FPC antenna 2.

An elastic metal sheet 10 having a suitable model and size can be selected according to an installation space inside the mobile device. A threaded hole can be formed at an edge of the metal middle frame 4, and then the elastic sheet 10 is connected to the metal middle frame 4 by means of a threaded connection. When installing the elastic sheet 10, the elastic sheet 10 can be set in a free state. Then when installing glass back shell 1, the elastic sheet 10 is pressed downward by the glass back shell 1, so that the elastic sheet 10 will always stay in a compressed state after the glass back shell 1 is mounted. In this way, it can ensure that the FPC antenna 2 can be always connected to the metal middle frame 4. With the connector having such a structure, the FPC antenna can be connected to the metal middle frame 4 without needing to provide an installation hole in the speaker box 5, which can prevent the installation hole from adversely affecting the structure or function of the speaker box 5.

The above are merely embodiments of the present disclosure and are not intended to limit the present disclosure. Those skilled in the art can make various modifications and changes to the present disclosure. However, any modification, equivalent substitution and improvement made within the principle of the present disclosure shall fall into the protection scope of the present disclosure.

What is claimed is:

1. A mobile device, comprising:
   a metal middle frame,
   a glass back shell covering the metal middle frame; and
   an FPC antenna disposed on an inner surface of the glass back shell,
   wherein the FPC antenna comprises a flexible substrate layer and a metal pattern layer attached to the flexible substrate layer, the flexible substrate layer is laminated onto the inner surface of the glass back shell, the metal pattern layer is formed on a surface of the flexible substrate layer by a LDS process, the FPC antenna is electrically connected to the metal middle frame, and the inner surface of the glass back shell faces the metal middle frame.

2. The mobile device as described in claim 1, further comprising a PVD coating provided on an outer surface of the glass back shell, wherein the outer surface is opposite to the inner surface.

3. The mobile device as described in claim 1, further comprising a beautification lacquer layer that is provided on the inner surface of the glass back shell.

4. The mobile device as described in claim 1, wherein the FPC antenna is electrically connected to the metal middle frame via a connector.

5. The mobile device as described in claim 4, further comprising a speaker box that is disposed between the metal middle frame and the glass back shell, wherein the speaker box comprises an installation hole through it in a thickness direction of the glass back shell, the connector is disposed in the installation hole, and the connector abuts against both the FPC antenna and the metal middle frame.

6. The mobile device as described in claim 4, further comprising a circuit board that is disposed between the metal middle frame and the glass back shell, wherein a first connector and a second connector are provided, the first connector abuts against both the FPC antenna and the circuit board, and the second connector abuts against both the circuit board and the metal middle frame.

7. The mobile device as described in claim 4, wherein the connector is an elastic sheet, the elastic sheet is detachably connected to the metal middle frame, and the elastic sheet abuts against both the FPC antenna and the metal middle frame.

8. A method for manufacturing the mobile device according to claim 1, comprising:
   step a of providing the glass back shell;
   step b of providing the flexible substrate layer;
   step c of laminating the flexible substrate layer onto a surface of the glass back shell; and
   step d of manufacturing the metal pattern layer on the surface of the flexible substrate layer by a LDS process.

* * * * *